July 3, 1945.   D. MACKENZIE   2,379,536
FLUID ACTUATED CONTROL SYSTEM
Filed June 18, 1941   5 Sheets-Sheet 4

INVENTOR
DONALD MACKENZIE,
BY Reynolds & Beach
ATTORNEYS

July 3, 1945.  D. MACKENZIE  2,379,536
FLUID ACTUATED CONTROL SYSTEM
Filed June 18, 1941  5 Sheets-Sheet 5

INVENTOR
DONALD MACKENZIE,
BY Reynolds & Beach
ATTORNEYS.

Patented July 3, 1945

2,379,536

UNITED STATES PATENT OFFICE 2,379,536

FLUID ACTUATED CONTROL SYSTEM

Donald MacKenzie, Cheltenham, England, assignor to Dowty Equipment Limited, Cheltenham, England Application June 18, 1941, Serial No. 398,674
In Great Britain July 3, 1940

6 Claims. (Cl. 60—97)

The present invention relates to fluid actuated control systems and is particularly concerned with the provision of a satisfactory system in which various operations have to be performed in a certain order, which may not necessarily be the same order as between operation in one sense compared with that in another.

A typical example of such a system is one which involves extension and retraction of aircraft alighting gear, which, in the retracted condition, is housed in a compartment closed by fairing doors, the alighting gear and the doors being operable by jack means. Thus, when it is required to effect extension of a retracted undercarriage, it is necessary first to open the fairing doors and then to extend the undercarriage, the fairing doors remaining open so long as the undercarriage remains extended. Conversely, at the termination of retraction operation, the fairing doors must close, and it is of the utmost importance that they should not start to close before the undercarriage is retracted far enough to avoid any possibility of it fouling the fairing doors, as it might well do if the doors started to close too soon. That typical system will later be described more particularly in the ensuing description, but it is to be understood that it may be varied considerably for different operations where jack or equivalent devices have to be actuated in some pre-determined relationship; for instance, cases may arise where it is desirable that wing flaps should not be operable until the undercarriage is extended, or conversely should not be operable in the opposite sense until the undercarriage is fully retracted. Again, the operations involved may include the control of a variable pitch airscrew.

The present invention consists in a fluid actuated control system including at least two jacks or like receiver means operable in a predetermined relationship in at least one sense of operation, a control device manually operable for controlling movement of at least one of said receiver means, and a control automatically operable on completion of an electric circuit by switch means actuated at some predetermined stage of the movement induced by actuation of the manual device whereby to control the operative relationship of said jack means.

On air craft there is frequently provided an electrically operated indicator device controlled by electrical contacts serving to complete an indicating circuit, for instance, when a retractable undercarriage is fully extended and also when it is fully retracted, and the invention includes the utilisation of the circuit involving indicator means for controlling the operative relationship of the jack means.

It will be realised that any particular jack or equivalent receiver means concerned with one operation or a set of operations may be at least duplicated and that likewise the various operations which are to be inter-related are not confined merely to two, but may be three or even more.

In order that it may be clearly understood and readily carried into effect, the invention is hereinafter described with reference to the accompanying digrammatic drawings, of which:

Figure 1:
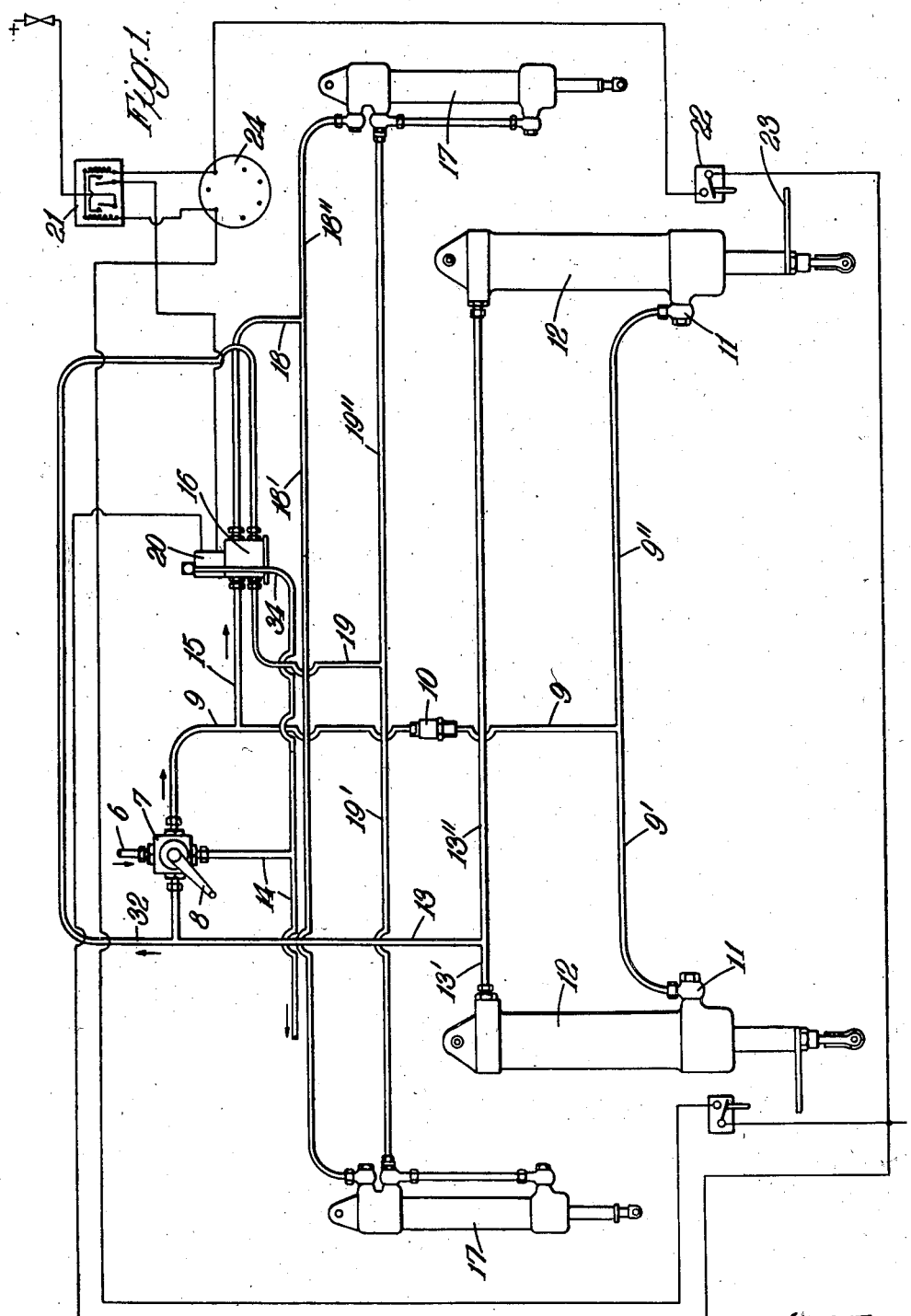
Figure 1 is a piping and wiring circuit diagram relating to a typical lay-out for operation of two undercarriage jacks and two fairing door jacks.

The arrangement shown in Figure 1 is in accordance with the typical example hereinbefore referred to, in which when the undercarriage is to be extended from a retracted condition the fairing doors have to open whereafter the undercarriage is extended, the fairing doors remaining open, while in retraction it is essential that the undercarriage should first retract before the fairing doors close.

Referring now to Figure 1, fluid pressure from any conveniently available source, preferably an engine driven hydraulic pump, is fed from the pipe line 6 to the rotary flow reversing valve 7 which is provided with a handle 8 for setting the valve to perform the requisite operations. The pipe line 9 conveys fluid preferably through a variable flow restriction valve 10 with branches 9′, 9″ to the jack unions 11, which in this case afford fluid flow passage for retraction of the undercarriage jacks 12, and during retraction of the jacks return fluid flows through the branches 13′, 13″ along the pipe line 13, to the control valve and then along the pipe 14 to the fluid pressure source. The pressure conduit 15 connects the pipe line 9 with the electrically operated control valve 16 which is arranged to permit fluid flow to the fairing jacks 17. Actuating fluid passes through the pipe line 18, with branches 18', 18'', for fairing jack extension and alternatively through the pipe line 19 with branches 19', 19'' to the other end of the fairing jacks for retraction. The valve 16 is controlled by the solenoid 20. 21 is a relay which controls operation of the solenoid 20, and thereby the automatic function of the valve 16. The function of the relay 21 is to prevent either fairing door jack being energised before both undercarriage jacks are fully retracted. (Alternatively, two switches may be incorporated, wired in series, in order to achieve the same effect.) The reference numeral 22 indicates plunger operated switches which, on being engaged by the switch actuating arms 23 complete the circuit to the indicator 24 for conveying to the pilot a signal that the undercarriage is properly up. Bridging of the switch contacts not only places the indicator device in circuit with an available current source, but also brings the relay 21 into the current supply circuit.

The system is of the kind in which actuating pressure is "live," being fed to the extension and retraction lines according to the setting of the reversing valve 7. When flow is to the jacks through the conduits 9', 9'' and 19', 19'' return flow is through the conduits 13', 13'' and 18', 18'' back through the valves 16 and 7 along the conduit 14 to the supply reservoir (not shown).

The invention will now best be understood with reference to the operation of the system, the explanation of which involves detailed description of the electrically controlled automatic valve 16.

Let it be assumed that the undercarriage is down and the fairing doors are open, as they are required to be in the circumstances. If then the actuating lever 8 of the rotary manual controlled valve 7 is moved to the up position, fluid flow is directed from the pressure line through the valve 7 along the pipe line 9 and branches 9', 9'' to retract the plungers of the jacks 12. Pressure fluid also passes along the pipe line 15 to the valve 16. Entering the valve 16 through the port 15a (see Fig. 2) pressure liquid is prevented by a non-return valve 25 from passing out of the valve through the port 19a and along the pipe line 19 and branches 19', 19'' to the fairing jacks 17. Likewise, a spring-loaded ball valve 26 closes the port 27, and hydraulically locks the ball 28 to its seat. The fluid can not, therefore, pass through the valve casing 16 under such conditions, but can only pass along the conduits 9', 9'' to the undercarriage jacks 12, to retract the undercarriage.

Immediately the undercarriage reaches its fully retracted position, the indicator switches 22 are actuated and not only is the indication undercarriage "up" given at the indicator 24, but also the circuit to the relay 21 is completed, with the result that the solenoid 20 is energised and the ball valve 26 lifted to permit passage of oil past the spring-loaded ball valve 28, through the valve chamber 29, port 30, to the chamber 30' to lift the piston 31 against resilience and open the valve 25. Immediately the valve 25 is opened, pressure fluid can find its way out through the port 19a along the pipe line 19 and branches 19', 19'' to the retraction union of the fairing jacks 17 thereby to close the doors. It will be observed that the valve body 16 includes a piston 31' which is paired with the piston 31 and is operated for opening therewith to control the valve 25' similar in nature and function to 25. When the valve 25' is open, pressure fluid returning from the fairing jacks 17 can find its way from the pipe line 18 into the port 18a and out through the port 32a to return through the pipe line 32 back into the circuit.

The valve 25' has an additional function in that when it is actuating as a non-return valve, it serves to afford a hydraulic lock preventing circulation of pressure fluid such as would be necessary to permit retraction of the fairing door jacks, and as a consequence of that hydraulic lock the fairing doors are securely maintained open against loads induced by the slip stream pressure before the undercarriage is properly retracted.

For extension of the undercarriage the control lever 8 is moved to the down position and oil passes direct to the undercarriage jacks through the pipe line 13, branches 13', 13'', and returns from their opposite ends through pipes 9, 9' and 9'' and valve 7 to conduit 14. Initial movement of the undercarriage downwards acts directly on the fairing doors to push them open as pressure fluid passes through the pipe line 32 in the direction shown by the arrow in Fig. 1 to circulate through 32a and 18a of the control valve 16 to extend the fairing jacks 15 through the pipe line 18 and branches 18', 18''. Relief for fluid in the opposite ends of the fairing jacks is afforded through lines 19, 19' and 19'' back through port 19a, past valve 25, and out through port 15a, conduit 15, and valve 7 to return conduit 14.

A non-return valve 33 is provided in the body of the solenoid to isolate the chamber 29 from the reservoir return pipe 34 from the solenoid when the ball 26 is lifted. Pressure liquid passing the non-return valve 28 cannot flow to the return pipe 34 through the solenoid when the ball valve 26 is lifted by reason of the fact that the additional non-return valve prevents entry into the return pipe 34 and pressure liquid from the undersides of the pistons 31, 31' therefore passes on de-energisation of the solenoid through the body of the solenoid past the non-return valve 33 to the reservoir return pipe 34.

The solenoid is continuously energized after retraction in order to maintain pressure on the fairing jacks, but the solenoid circuit may be broken after retraction is completed and the fairing doors retained in position by the hydraulic lock or mechanical latches. Additional means to obtain interruption of the solenoid circuit would be a switch or switches operated by the fairing doors in their fully closed position.

The solenoid consumes a small amount of current only, and can be kept continuously energised without undue temperature rise.

The arrangement hereinbefore described deals with a single sequence operation; that is to say, the system operates to prevent fairing door jacks being closed before the undercarriage has reached a fully up position. The necessity for a system controlled sequence operation for opening the fairing door jacks prior to movement of the undercarriage out from its fully retracted position need not arise in the case foreshadowed, because the fairing doors can be designed to be opened by undercarriage initial extension movement. If, however, a double sequence operation is required to ensure opening of the fairing doors prior to extension, extension of the undercarriage (fairing doors remaining open while the undercarriage remains extended) and, reversing the procedure, first retraction of the undercarriage and then closure of the fairing doors at the end of the retraction operation, a modified arrangement is required. A typical double sequence operation is shown with reference to Figure 3, which illustrates a system for controlling bomb hatch door latches for locking and unlocking and for appropriately actuating the bomb hatch doors for opening and closing. The sequence required in such a case is (assuming bomb hatch doors closed) (1) unfasten latches, (2) open bomb hatch doors, (3) close bomb hatch doors, and (4) refasten latches. Jack means are provided for latch operation and for opening and closing the bomb hatch doors. The double sequence operation described with reference to Figure 3 requires a modified construction of valve which is illustrated in Figures 4 and 5, to be read in conjunction with Figure 3.

Figure 3:
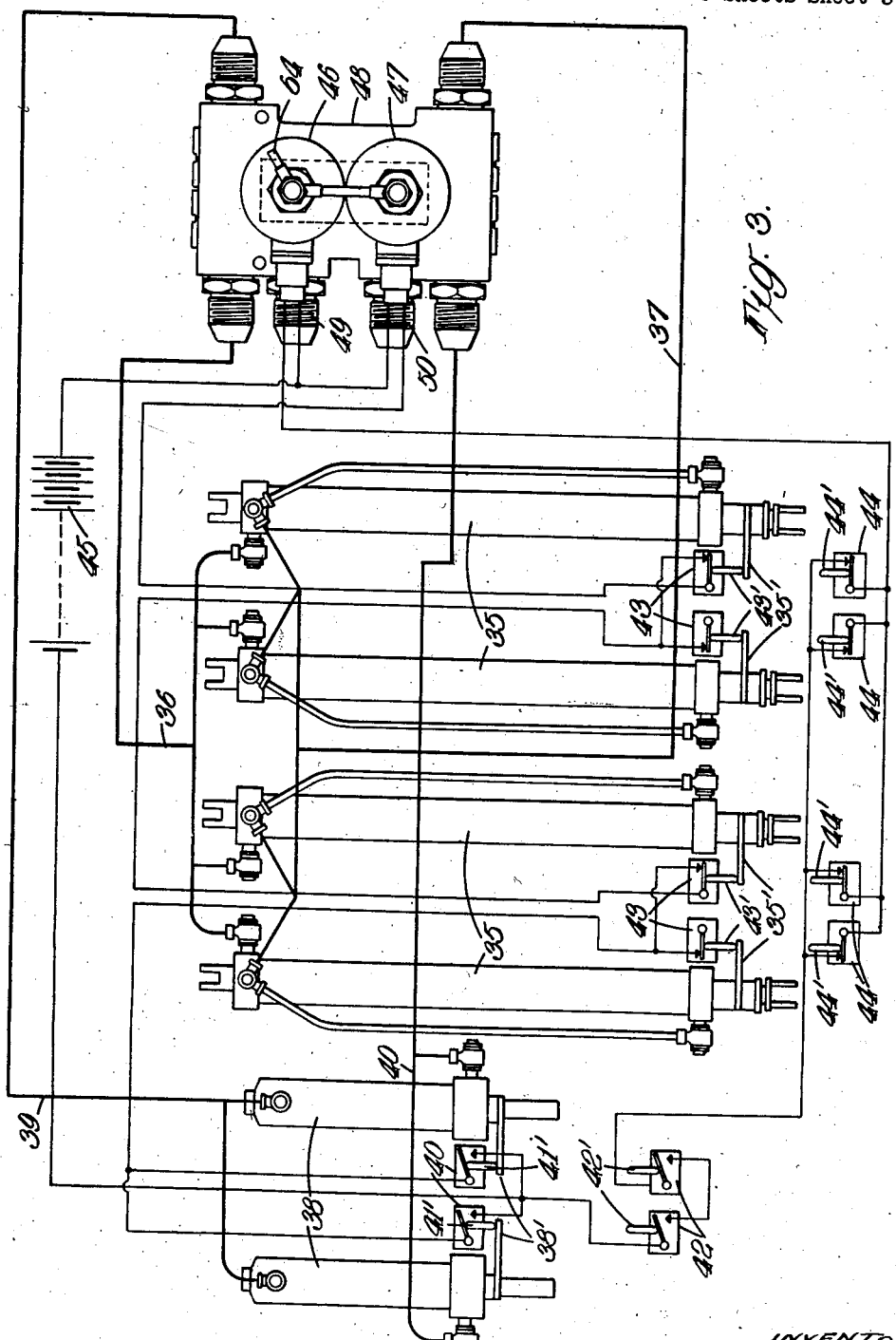
Figure 3 is a piping and wiring circuit diagram illustrating a typical lay-out for operation of bomb-hatch doors and latches.
Figure 4:
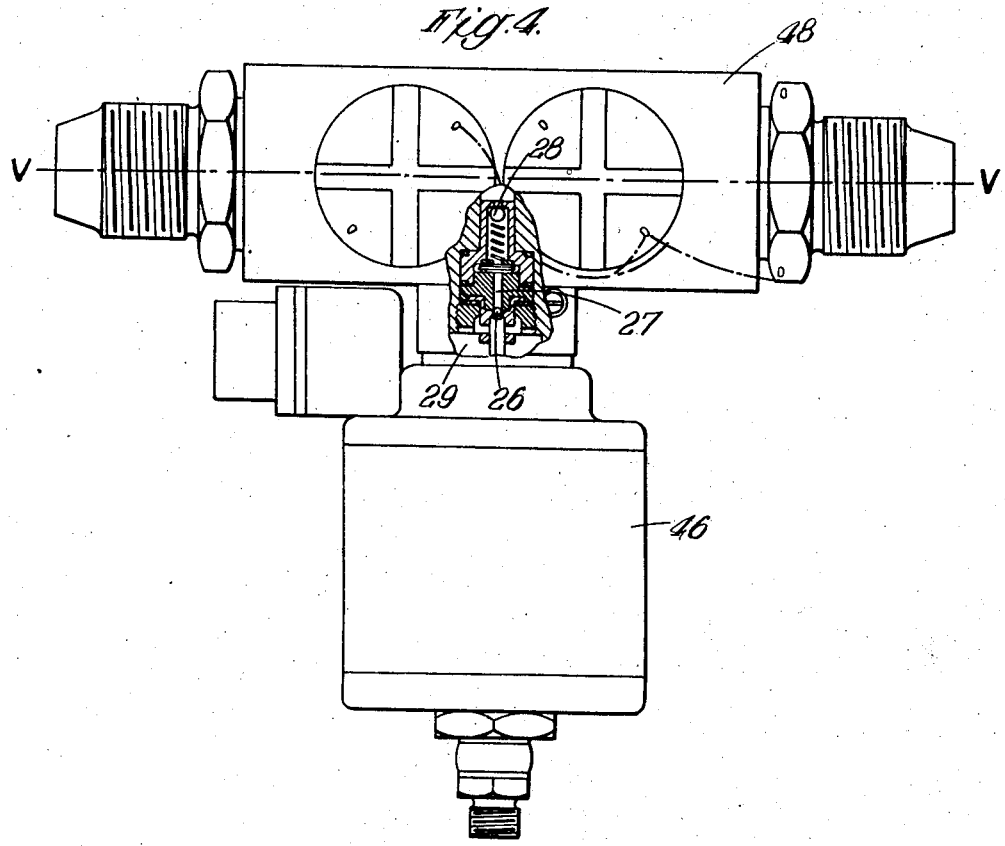
Figure 4 is an end elevation partly in section of an electrically operating automatic valve which controls the relationship between the door and latch actuating jacks.

Referring now to Figure 3, the jacks 35, which are selectively operable for retraction and extension to open and close the bomb hatch doors, are supplied with pressure fluid for extension through the conduit 36, and for retraction through the conduit 37. The latch actuating jacks are indicated at 38 and are supplied with pressure fluid for extension to release the latches through the conduit 39 and conversely with pressure fluid for retraction through the conduit 40. The plungers of the jacks 38 have switch actuating arms 38' which in the fully retracted condition of the plungers of the jacks 38 make contact with the plungers 41' of the switches 41. The switches 41 are normally closed but are opened by the arms 38'. The switches 42 are normally open and have plungers 42' which are engaged by the arms 38' when the plungers reach their fully extended condition. The bomb hatch door actuating jacks 35 have switch actuating arms 35' which, in the retracted condition of the jacks, engage the plungers 43' of the switches 43 to close the switches which are normally open. The switches 44 are normally closed but are opened by the actuating arms 35' in the extended condition of the jacks 35. Closure of the switches 41, 42, 43 and 44, completes the circuit from the battery 45 to one or other of the solenoids 46, 47, whereby to determine the operational sequence of the system under control of the valve, indicated generally at 48. The valve 48 is supplied with pressure fluid through the connection 49 on operation of a manual control valve (not shown) similar to the selector valve 7 shown in Fig. 1 when it is required to open the bomb doors, during which operation return flow of liquid is through the connection 50 back through the control valve and supply reservoir, not shown. Conversely, when the bomb doors require to be closed pressure flows into the valve 48 through the connection 50 and out from the connection 49 back to the reservoir.

Figure 5:
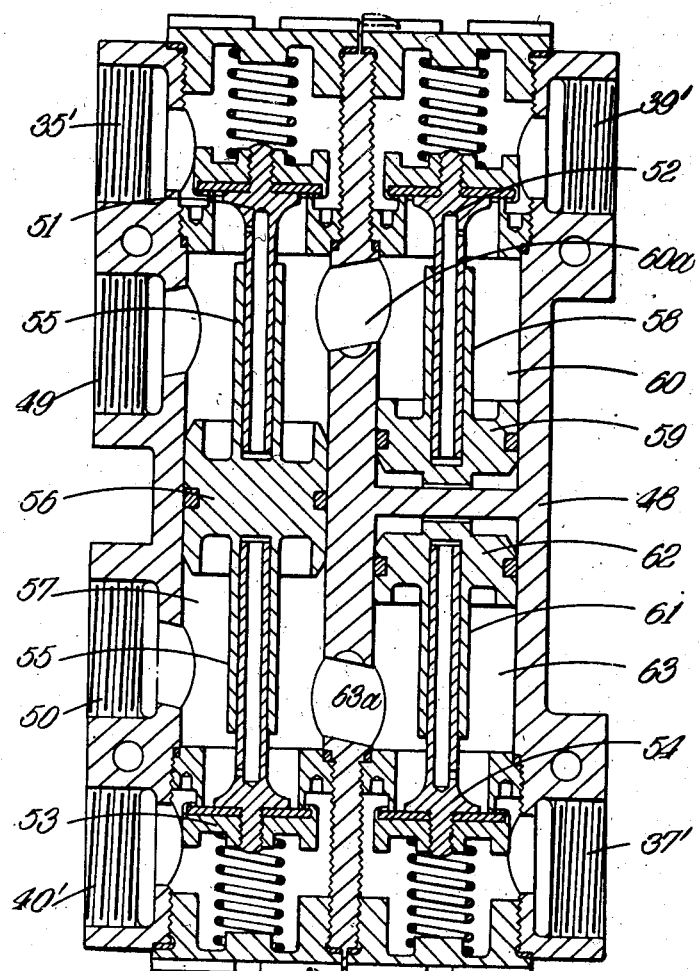
Figure 5 is a section on the line V—V of Figure 4.

The nature of the valve 48 is best seen by reference to Figure 5. The conduit 36 is connected from the extension side of the jacks 35 to the port 35'. Similarly, the conduit 39 for extension of the latch jacks connects to the port 39'. The conduits 37 and 40 lead into the valve 48 through the connections 37' and 40'. The connections 49 and 50 are appropriately flow or return according to the setting of a manual control valve as has previously been described. Internally the body of the valve 48 contains non-return valves 51, 52, 53 and 54, which are spring loaded to close on to their seats. The stems of the non-return valves 51 and 53 are carried by guides 55 extending from the piston 56 slidable in the bore 57. The stem of the non-return valve 52 is carried by the guide 58 extending from the piston 59 sliding in the bore 60. Likewise, the stem of the non-return valve 54 is engaged by the guide 61 extending from the piston 62 sliding in the bore 63. The bore 60 behind the piston 59 is in communication with the bore 57 on one side of the piston 56 through the passage 60a and the bore 63 behind the piston 62 is in communication with the bore 57 on the other side of the piston 56 through the passage 63a.

The system described with reference to Figures 3, 4 and 5, will now best be understood by describing an operational sequence, it being assumed that the sequence starts with the bomb hatch doors closed and latched. Thus the manual control valve is actuated to deliver pressure fluid to the valve body 48 through the connection 49. The pressure fluid opens the non-return valve 52 to the conduit 39 and extends the plungers of the jacks 38. Fluid pressure internally of the bore 57 also moves the piston 56 to open the non-return valve 53 so that return fluid can flow along the conduit 40 through the connection 40' past the non-return valve 53 out through the connection 50 back to the reservoir. When the plungers of the jacks 38 are fully extended, the latches are unlocked and the switch actuating arms 38' engage the plungers 42' to energise the solenoid 46.

Figure 2:
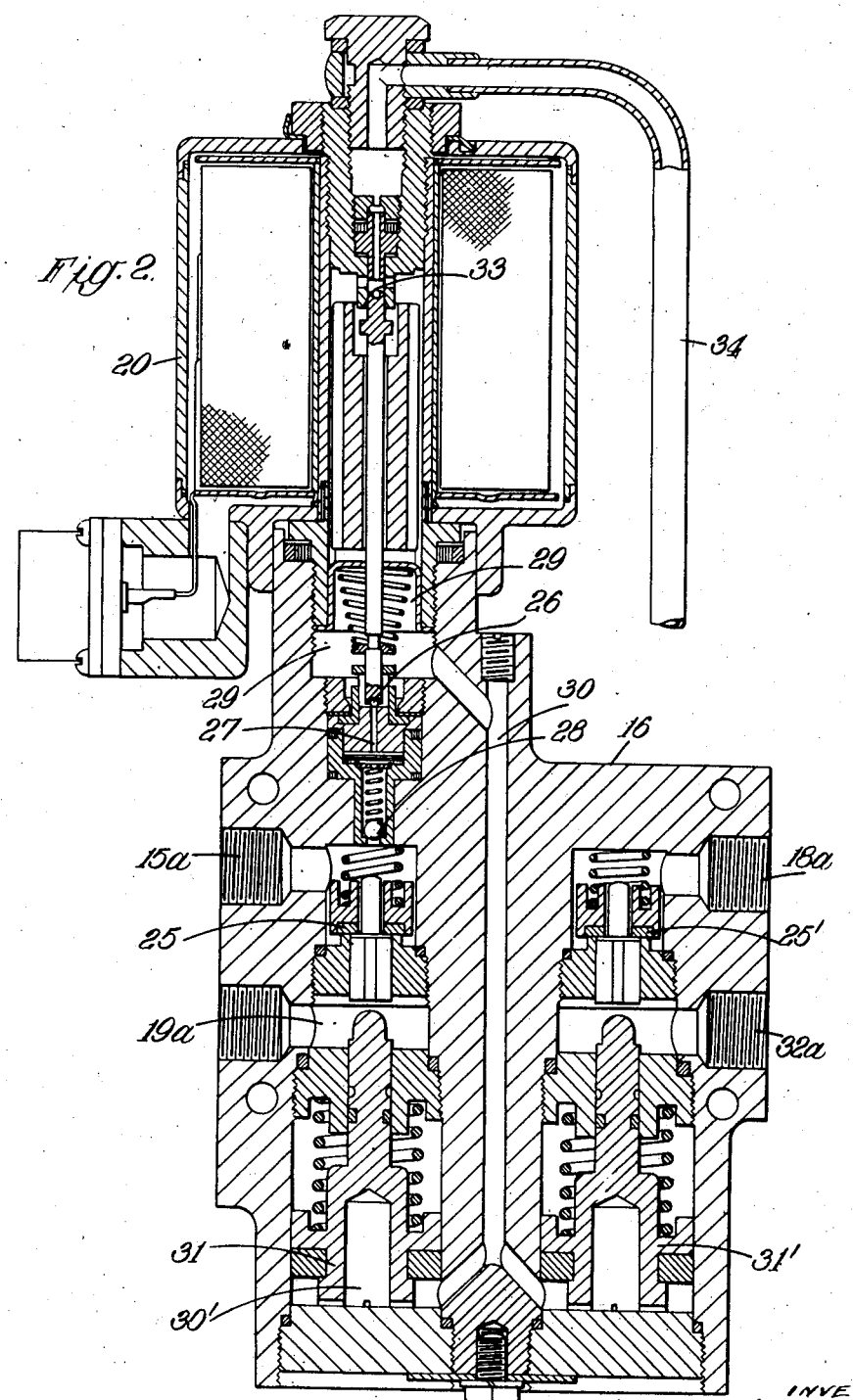
Figure 2 is a sectional elevation showing the electrically operated automatic valve which controls the relationship required between the jacks.

It may here be mentioned that the solenoids 46 and 47 and their internal valve arrangement, are the same as that described with reference to Figure 2, but in the present case a port corresponding to the port 30, referred to in Figure 2, is opened by energisation of the solenoid 46 to deliver pressure fluid supplied to the valve through the connection 49 to the closed end of the bore 63 and actuate the piston 62 to open the non-return valve 54, and the solenoid 47 in the same way establishes communication between the connection 50 and the closed end of the bore 60 to actuate the piston 59 for opening the non-return valve 52.

Thus, energisation of the solenoid 46 by closing of the switches 42 causes the non-return valve 54 to open, thus to release the fluid from the door jacks 35 through conduit 37 to conduit 50, leading to the reservoir, so that pressure fluid flowing through the connection 49 then may open the non-return valve 51 allowing the passage of pressure fluid to the conduit 36 for extension of the bomb hatch door jacks 35. When the plungers of the jacks 35 are fully extended the bomb hatch doors are fully open and the switch actuating arms 35' open the switches 44 to de-energise the solenoid, whereupon the spring loading of the non-return valve 54 causes it to close, pushing the pressure fluid in the closed end of the bore 63 back to the reservoir through the body of the solenoid and conduit 64.

To close the bomb hatch doors, the control lever of the manual control valve is reversed and pressure fluid enters the body of the valve 48 through the connection 50 from which return flow through the manual control valve to reservoir can pass out of the body 48 through the connection 49. Pressure fluid entering the connection 50 causes the non-return valve 54 to open, at the same time actuating the piston 56 to open the non-return valve 51 to permit return flow from the jacks 35 through the conduit 36 past the non-return valve 51 and out to reservoir through the connection 49. When the jacks 35 reach their fully retracted position the bomb hatch doors are closed and their switch actuating arms 35' close the switches 43 to energise the solenoid 47. Energisation of the solenoid 47 directs pressure fluid to the closed end of the bore 60 with the result that the piston 59 is actuated to open the non-return valve 52 to permit return flow from the conduit 39 and latch jacks 38 back to reservoir through the connection 49, whereupon the non-return valve 53 is opened by the pressure fluid which is directed along the conduit 40 to retract the plungers of the jacks 38 and secure the latches on the already closed bomb hatch doors. When the jacks 38 are fully retracted their switch actuating arms 38' open the switches 40 to de-energise the solenoid 47 and the non-return valve 52 closes under its spring loading, oil flowing from the closed end of the bore 60 through the body of the solenoid and return conduit 64 to reservoir.

Reversing valve 7 may be operated by suitable electrical remote control means, if desired, in place of an ordinary manual control valve as suggested in the foregoing description.

What I claim is:

1. Valve mechanism for controlling a fluid operated element, comprising a valve body having a pressure fluid supply and discharge connection, a connection to said fluid operated element, a valve in said valve body having its opposite sides exposed to the pressure in said respective connections and adapted to be pressed to its seat by pressure in the supply and discharge connection superior to pressure in the fluid operated element connection, a piston engageable with said valve to open it, a cylinder receiving said piston, a by-pass duct between said fluid supply and discharge connection and said cylinder, and electrically operated means controlling said by-pass duct and operable to open it for supply of fluid to said cylinder to move said piston to open said valve against pressure in said supply and discharge connection superior to pressure in said fluid operated element connection, and said valve and piston being mechanically unconnected for movement of said valve to open position independently of movement of said piston by pressure in said fluid operated element connection superior to the pressure in said supply and discharge connection.

2. Valve mechanism for controlling a fluid operated element, comprising a valve body having a pressure fluid supply and discharge connection, a connection to said fluid operated element, a valve in said valve body having its opposite sides exposed to the pressure in said respective connections and adapted to be pressed to its seat by pressure in the supply and discharge connection superior to pressure in the fluid operated element connection, fluid actuated valve operating means operable to open said valve, a by-pass duct between said fluid supply and discharge connection and said valve operating means, and electrically operated means controlling said by-pass duct and operable to open it for supply of fluid to said valve operating means to open said valve against pressure in said supply and discharge connection superior to pressure in said fluid operated element connection, and said valve and valve operating means being mechanically unconnected for movement of said valve to open position independently of movement of said valve operating means by pressure in said fluid operated element connection superior to the pressure in said supply and discharge connection.

3. Valve mechanism for a double-acting fluid jack, comprising a valve body having therein a supply connection communicating with a source of fluid under pressure, a connection to the jack for flow of fluid thereto, a jack duct in said valve body between said connections, a second connection to the jack for flow of fluid therefrom, and a fluid discharge connection, a non-return valve between said second jack connection and said discharge connection, normally urged to its seat by pressure thereon of fluid entering said valve body from said second jack connection, a piston movable in a piston chamber formed in said valve body, operable to engage said non-return valve for raising it from its seat against the pressure of fluid in said second jack connection, said valve body having a passage independent of said jack duct between the piston chamber and said fluid supply connection for actuation of said piston to open said non-return valve by pressure of fluid thereon, and solenoid operated valve means controlling communication between said supply connection and the piston chamber to effect valve opening movement of the piston only when said solenoid is energized.

4. In an aircraft structure, a fluid system for actuating an initially operable fluid operated element and a secondarily operable fluid operated element, comprising pressure fluid supply and discharge conduits, a valve body having a connection to each of said fluid supply and discharge conduits, a feed connection to each of said fluid operated elements, and a return connection from each of said fluid operated elements, said valve body being apertured to establish communication between the supply conduit connection and both fluid operated element feed connections, and between the discharge connection and both of said fluid operated element return connections, valve means in said valve body interposed between said discharge connection and the secondarily operable fluid operated element return connection, and operating means for said valve means energizable to open the same for flow of fluid through said secondarily operable fluid operated element return connection, and means associated with the initially operable fluid operated element operatively connected to said valve operating means to energize such means for opening said valve at a predetermined stage of the movement of said initially operable fluid operated element, to enable fluid to return through said valve body to said discharge conduit from said secondarily operable fluid operated element, and simultaneously to enable fluid to be supplied from said valve body to such secondarily operable fluid operated element.

5. In an aircraft structure, a fluid system for actuating two fluid operated elements, a pressure fluid supply and discharge conduit connected directly to one of said fluid operated elements, a valve body having a connection to said fluid supply and discharge conduit, and a further connection to the other fluid operated element, a valve in said valve body interposed between said fluid supply and discharge connection and said fluid operated element connection, said valve being movable in one direction by the operation of differential pressures on said valve to permit unidirectional flow of fluid between said connections, electrically controlled pressure fluid operating means for the valve energizable to open said valve positively for flow of fluid in the opposite direction between said connections, but unconnected to said valve for movement of said valve independently of said valve operating means under such differential pressure conditions, switch means operable by said first fluid operated element at a predetermined stage in its movement to control energization of said valve operating means for effecting positive movement of said valve, and means to control selectively the supply of fluid under pressure through said supply and discharge conduit to said fluid operated elements and the relief of pressure in said supply and discharge conduit for discharge of fluid therethrough from said fluid operated elements.

6. In an aircraft structure, a fluid system for actuating two fluid operated elements, a pressure fluid supply and discharge conduit connected directly to one of said fluid operated elements, a valve body having a connection to said fluid supply and discharge conduit, and a further connection to the other fluid operated element, a valve in said valve body interposed between said fluid supply and discharge connection and said fluid operated element connection, said valve being movable in one direction by the operation of differential pressures on said valve to permit unidirectional flow of fluid between said connections, operating means for the valve energizable to open said valve positively for flow of fluid in the opposite direction between said connections, but unconnected to said valve for movement of said valve independently of said valve operating means under such differential pressure conditions, means operable by said first fluid operated element at a predetermined stage in its movement to control energization of said valve operating means for effecting positive movement of said valve, and means to control selectively the supply of fluid under pressure through said supply and discharge conduit to said fluid operated elements and the relief of pressure in said supply and discharge conduit for discharge of fluid therethrough from said fluid operated elements.

DONALD MacKENZIE.